United States Patent
Kim et al.

(10) Patent No.: US 11,233,587 B2
(45) Date of Patent: Jan. 25, 2022

(54) METHOD FOR RECEIVING INFORMATION FOR MEASURING SELF-INTERFERENCE, AND TERMINAL THEREFOR

(71) Applicant: LG Electronics Inc., Seoul (KR)

(72) Inventors: Dongkyu Kim, Seoul (KR); Sangrim Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/763,002

(22) PCT Filed: Nov. 14, 2017

(86) PCT No.: PCT/KR2017/012820
§ 371 (c)(1),
(2) Date: May 11, 2020

(87) PCT Pub. No.: WO2019/098395
PCT Pub. Date: May 23, 2019

(65) Prior Publication Data
US 2020/0313779 A1    Oct. 1, 2020

(51) Int. Cl.
*H04B 17/24*    (2015.01)
*H04B 17/345*    (2015.01)

(52) U.S. Cl.
CPC .......... *H04B 17/24* (2015.01); *H04B 17/345* (2015.01)

(58) Field of Classification Search
CPC .............................. H04B 17/24; H04B 17/345
See application file for complete search history.

(56) References Cited

U.S. PATENT DOCUMENTS

| 8,385,935 B2 | 2/2013 | Shin et al. |
| 9,025,478 B2 | 5/2015 | Jung et al. |
| 2013/0044621 A1* | 2/2013 | Jung ............... H04L 5/0007 370/252 |
| 2013/0242771 A1 | 9/2013 | Ohta et al. |
| 2017/0013489 A1* | 1/2017 | Seo ................ H04W 24/08 |
| 2017/0104576 A1* | 4/2017 | Liu .................. H04B 1/525 |
| 2017/0163404 A1* | 6/2017 | Liu ................ H04W 72/042 |

FOREIGN PATENT DOCUMENTS

| CN | 103988456 A | 8/2014 |
| CN | 105284066 A | 1/2016 |
| KR | 10-2016-0019431 A | 2/2016 |

(Continued)

OTHER PUBLICATIONS

LG-Nortel, "Self-Interference: Measurement and Cancellation", 3GPP TSG RAN1 #57, May 4-8, 2009, R1-092185, XP050339618.

*Primary Examiner* — Minh Trang T Nguyen
(74) *Attorney, Agent, or Firm* — Dentons US LLP

(57) ABSTRACT

A method for a terminal to receive information for measuring self-interference may comprise: a step of receiving, from a base station, RS configuration information including information on an RS for measuring self-interference; a step of measuring self-interference on the basis of the RS configuration information by using the RS for measuring self-interference; and a step of reporting, to the base station, information on the measurement result of the self-interference. The UE is capable of communicating with at least one of another UE, a UE related to an autonomous driving vehicle, a base station or a network.

14 Claims, 19 Drawing Sheets

(56) References Cited

FOREIGN PATENT DOCUMENTS

| | | | |
|---|---|---|---|
| KR | 10-2016-0046925 | A | 4/2016 |
| KR | 10-2016-0131400 | A | 11/2016 |
| WO | 2015081514 | A1 | 6/2015 |
| WO | 2016167466 | A1 | 10/2016 |
| WO | 2017/069300 | A1 | 4/2017 |

* cited by examiner

METHOD FOR RECEIVING INFORMATION FOR MEASURING SELF-INTERFERENCE, AND TERMINAL THEREFOR

This application is a National Stage Entry of International Application No. PCT/KR2017/012820 filed Nov. 14, 2017, which is hereby incorporated by reference in its entirety for all purposes as if fully set forth herein.

TECHNICAL FIELD

The present disclosure relates to wireless communication, and more particularly, to a method of receiving information for measuring self-interference and user equipment therefor.

BACKGROUND ART

In the next generation 5G system, scenarios can be categorized into Enhanced Mobile Broadband (eMBB), Ultra-reliable Machine-Type Communications (uMTC), Massive Machine-Type Communications (mMTC), etc. The eMBB is a next-generation mobile communication scenario with properties such as High Spectrum Efficiency, High User Experience Data Rate, High Peak Data Rate, etc. The uMTC is a next-generation mobile communication scenario (e.g., V2X, Emergency Service, Remote Control) with properties such as Ultra Reliable, Ultra Low Latency, Ultra High Availability, etc. And, the mMTC is a next-generation mobile communication scenario (e.g., IoT) with properties such as Low Cost, Low Energy, Short Packet, and Massive Connectivity.

DETAILED DESCRIPTION OF THE DISCLOSURE

Technical Tasks

One technical task of the present disclosure is to provide a method of receiving information for measuring self-interference and user equipment therefor.

Another technical task of the present disclosure is to provide a user equipment for receiving information for measuring self-interference.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solutions

In one technical aspect of the present disclosure, provided herein is a method of receiving information for measuring self-interference by a user equipment, the method including receiving Reference Signal (RS) configuration information on an RS for self-interference measurement from a base station, measuring self-interference using the RS for the self-interference measurement based on the RS configuration information, and reporting information on a measurement result of the self-interference to the base station.

The RS configuration information may include information on a resource location of the self-interference measurement RS. The information on the RS configuration may be received through one of Radio Resource Control (RRC), Downlink Control Information (DCI), and group-common Physical Downlink Control CHannel (PDCCH).

The method may further include receiving control information indicating to perform measurement based on the RS for the self-interference measurement as the RS configuration information is valid, and the self-interference may be measured based on the RS configuration information and the control information. The control information may further include information on a frequency location of the RS related to the valid RS configuration information. The information on the measurement result of the self-interference may be periodically reported to the base station.

If a self-interference measurement value according to the measurement result of the self-interference is greater than a preset threshold or a difference from a previously reported self-interference measurement value is greater than a preset difference value, the information on the measurement result of the self-interference may be periodically reported to the base station.

The method may further include receiving a signal indicating whether to enable or disable periodic self-interference measurement, and the measurement of the self-interference may be related to the periodic self-interference measurement if the 'enable' is indicated.

The control information may further include information of a specific time in which the RS configuration information is valid and the measurement of the self-interference may be performed in the valid specific time.

Cancellation of the self-interference may be related to self-interference cancellation in an analog domain.

In another technical aspect of the present disclosure, provided herein is a user equipment for receiving information for measuring self-interference, the user equipment including a receiver configured to receive Reference Signal (RS) configuration information on an RS for self-interference measurement from a base station, a processor configured to measure self-interference using the RS for the self-interference measurement based on the RS configuration information, and a transmitter configured to report information on a measurement result of the self-interference to the base station. The RS configuration information may include information on a resource location of the self-interference measurement RS.

The receiver may be configured to receive control information indicating to perform measurement based on the RS for the self-interference measurement as the RS configuration information is valid and the processor may be configured to measure the self-interference based on the RS configuration information and the control information.

If a self-interference measurement value according to the measurement result of the self-interference is greater than a preset threshold or a difference from a previously reported self-interference measurement value is greater than a preset difference value, the transmitter may be configured to report the information on the measurement result of the self-interference to the base station.

Cancellation of the self-interference may be related to self-interference cancellation in an analog domain.

Advantageous Effects

The present disclosure relates to an intermediate step in the direction of the realistic evolution of FDR technology, and defines the procedures and signaling for designing and operating a Reference Signal (RS) for the mitigation or resolution of cross-link interference in a flexible duplex wireless transmission scheme that allocates the existing allocated DL or UL band as UL or DL that is different duplex, thereby remarkably improving performance of communication in the flexible duplex scheme.

The effects that can be achieved with the present disclosure are not limited to what has been particularly described hereinabove and other advantages not described herein will be more clearly understood by persons skilled in the art from the following detailed description of the present disclosure.

DESCRIPTION OF DRAWINGS

The accompanying drawings, which are included to provide a further understanding of the disclosure, illustrate embodiments of the disclosure and together with the description serve to explain the principle of the disclosure.

BEST MODE FOR DISCLOSURE

Figure 1:
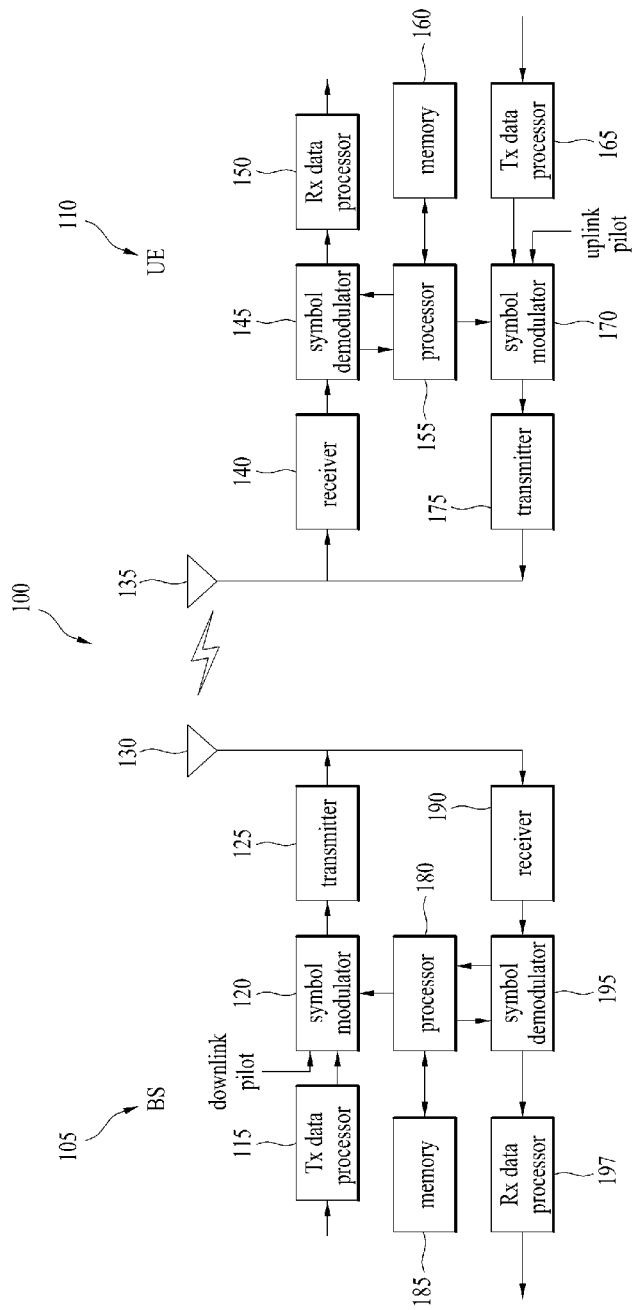
FIG. 1 is a block diagram of configurations of a base station 105 and a user equipment 110 in a wireless communication system 100.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE/LTE-A system, the following descriptions are applicable to other random mobile communication systems in a manner of excluding unique features of the 3GPP LTE/LTE-A.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on IEEE 802.16m system, contents of the present invention may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present invention. And, the use of the specific terminology can be modified into another form within the scope of the technical idea of the present invention.

FIG. 1 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 1, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

Figure 2:
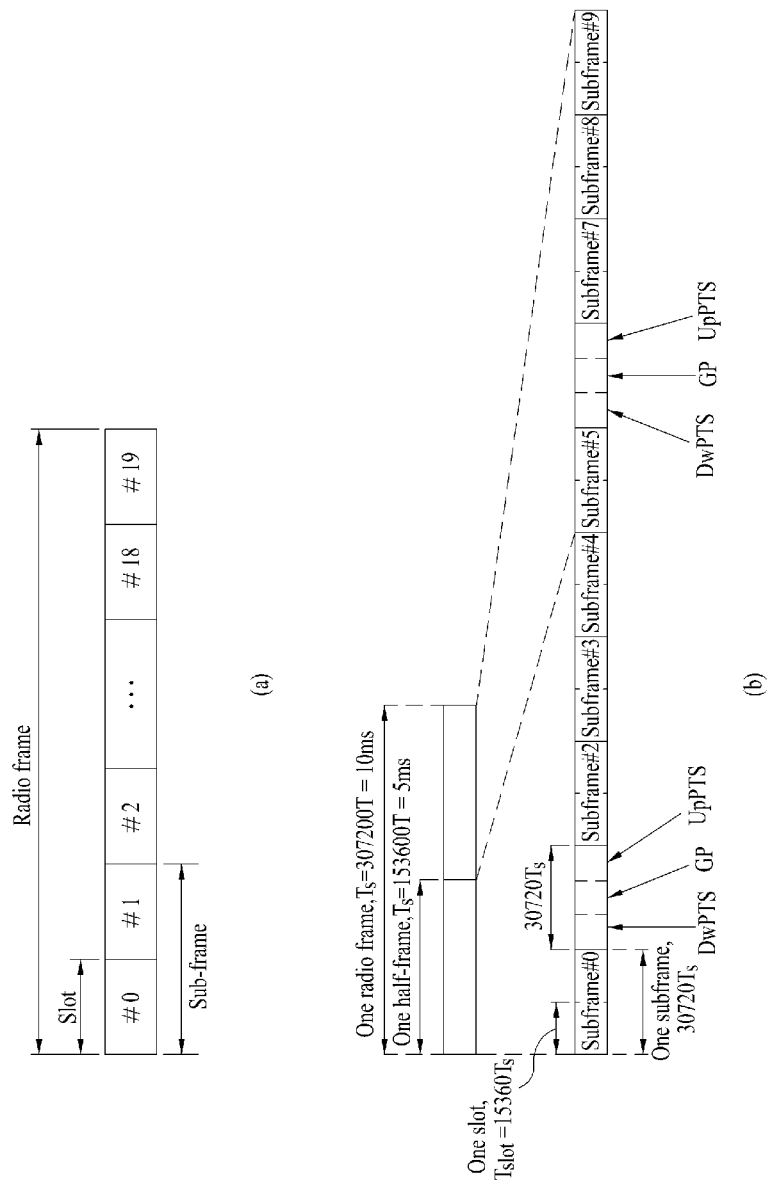
FIG. 2 is a diagram illustrating the structure of a radio frame used in a 3GPP LTE/LTE-A system as an exemplary wireless communication system.

FIG. 2 illustrates a radio frame structure used in a 3GPP LTE/LTE-A system as an exemplary wireless communication system.

As general wireless transmission, in wireless transmission between a BS and a wireless terminal as wireless devices, wireless transmission from the BS to the wireless terminal is referred to as downlink transmission and transmission from the wireless terminal to the BS is referred to as uplink transmission. A scheme for distinguishing between wireless resources of downlink transmission and uplink transmission is defined as "duplex". Dividing a frequency band into a downlink transmission band and an uplink transmission band and performing bidirectional transmission is referred to as Frequency Division Duplex (FDD) and dividing time-domain wireless resources into downlink time duration resources and uplink time duration resources in the same frequency band and performing transmission and reception is referred to as Time Division Duplex (TDD).

In a cellular OFDM wireless packet communication system, uplink/downlink data packets are transmitted in subframes. One subframe is defined as a predetermined time interval including a plurality of OFDM symbols. The 3GPP LTE standard supports the structure of a type 1 radio frame applicable to FDD and the structure of a type 2 radio frame applicable to TDD.

(a) FIG. 2 illustrates the structure of the type 1 radio frame. A downlink (DL) radio frame includes 10 subframes, each subframe including two slots in the time domain. A time required to transmit one subframe is defined as a Transmission Time Interval (TTI). For example, one subframe may be 1 ms long and one slot may be 0.5 ms long. One slot includes a plurality of OFDM symbols in the time domain and a plurality of Resource Blocks (RBs) in the frequency domain. Since 3GPP LTE uses OFDMA for DL, an OFDM symbol is one symbol period. The OFDM symbol may be called an SC-FDMA symbol or symbol period. An RB is a resource allocation unit including a plurality of contiguous subcarriers in one slot.

The number of OFDM symbols included in one slot may be changed according to the configuration of a Cyclic Prefix (CP). There are two types of CPs, extended CP and normal CP. For example, if each OFDM symbol is configured to include a normal CP, one slot may include 7 OFDM symbols. If each OFDM symbol is configured to include an extended CP, the length of an OFDM symbol is increased and thus the number of OFDM symbols included in one slot is less than that in the case of a normal CP. In the case of the extended CP, for example, one slot may include 6 OFDM symbols. If a channel state is unstable, as is the case when the UE moves at high speed, the extended CP may be used in order to further reduce inter-symbol interference.

When the normal CP is used, since one slot includes 7 OFDM symbols, one subframe includes 14 OFDM symbols. Up to the first three OFDM symbols of each subframe may be allocated to a Physical Downlink Control Channel (PDCCH) and the remaining OFDM symbols may be allocated to a Physical Downlink Shared Channel (PDSCH).

(b) of FIG. 2 illustrates the structure of the type 2 radio frame.

The type 2 radio frame includes two half-frames, each half-frame including five subframes, a Downlink Pilot Time Slot (DwPTS), a Guard Period (GP), and an Uplink Pilot Time Slot (UpPTS). One subframe includes two slots. DwPTS is used for initial cell search, synchronization, or channel estimation at a UE and UpPTS is used for channel estimation and Uplink (UL) transmission synchronization with a UE at a BS. GP is used to cancel UL interference between UL and DL, caused by multi-path delay of a DL signal.

Each half-frame includes 5 subframes. A subframe indicated by "D" is a subframe for DL transmission, a subframe indicated by "U" is a subframe for UL transmission, and a subframe indicated by "S" is a special subframe including a DwPTS, a GP, and a UpPTS. DwPTS is used for initial cell search, synchronization, or channel estimation at a UE and UpPTS is used for channel estimation and UL transmission synchronization with a UE at a BS. GP is used to cancel UL interference between UL and DL, caused by multi-path delay of a DL signal.

If a DL-UL switch-point periodicity is 5 ms, the special subframe S exists in every half-frame and if the DL-UL switch-point periodicity is 10 ms, the special subframe S exists only in the first half-frame. Subframe indexes 0 and 5 and the DwPTS are used for DL transmission. The UpPTS and a subframe following the special subframe are always used for UL transmission. If multiple cells are aggregated, it may be assumed that a UE has the same UL-DL configuration over all cells and GPs of special subframes in different cells overlap during at least 1456 Ts. The structure of the radio frame is purely exemplary and the number of subframes included in a radio frame, the number of slots included in a subframe, or the number of symbols included in a slot may be changed in various manners.

Table 1 shows a special frame configuration (the length of DwPTS/GP/UpPTS).

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |

TABLE 1-continued

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Table 2 lists UL-DL configurations in the type 2 frame structure in a 3GPP LTE system.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 2, in the 3GPP LTE system, 7 UL-DL configurations are present in the type 2 frame structure. The position and number of each of a DL subframe, a special subframe, and a UL subframe may differ according to each configuration. Hereinafter, various embodiments of the present invention will be described based on the UL-DL configurations of the type 2 frame structure shown in Table 2. Table 3 shows values of k for TDD configurations 0 to 6.

TABLE 3

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | 7 | 4 | | | | 7 | 4 | | | |
| 1 | | 4 | | | 6 | | | 4 | | 6 |
| 2 | | | | 6 | | | | | 6 | |
| 3 | 6 | | | | | | | 6 | 6 | |
| 4 | | | | | | | | 6 | 6 | |
| 5 | | | | | | | | | 6 | |
| 6 | 6 | 4 | | | | 7 | 4 | | | 6 |

For a type 1 frame structure, a HARQ-ACK received on a PHICH assigned to a UE in subframe I is associated with PUSCH transmission in subframe i-4. For UL-DL configurations 1 to 6 of the type 2 frame structure, a HARQ-ACK received on the PHICH assigned to the UE in subframe I is associated with PUSCH transmission in subframe i-k (where k is indicated in Table 3).

Hereinbelow, a HARQ-ACK procedure of the UE in the 3GPP LTE/LTE-A system will be described in brief. The present invention will be described based on the HARQ-ACK procedure of the UE in the 3GPP LTE/LTE-A system.

TABLE 4

For Frame Structure type 2 UL/DL configuration 1-6, a HARQ-ACK received on the
PHICH assigned to a UE in subframe i is associated with PUSCH transmission in the
subframe i-k as indicated by Table 3.
For Frame Structure type 2 UL/DL configuration 0, a HARQ-ACK received on the
PHICH in the resource corresponding to IPHICH = 0, assigned to a UE in subframe i is
associated with PUSCH transmission in the subframe i-k as indicated by the table 3. If,
for Frame Structure type 2 UL/DL configuration 0, a HARQ-ACK received on the
PHICH in the resource corresponding to IPHICH = 1, assigned to a UE in subframe i is
associated with PUSCH transmission in the subframe i-6.
The physical layer in the UE shall deliver indications to the higher layers as follows:
For downlink subframe i, if a transport block was transmitted in the associated PUSCH
subframe then:
    if ACK is decoded on the PHICH corresponding to the transport block in
subframe i, ACK for that transport block shall be delivered to higher layers;
    else NACK for that transport block shall be delivered to higher layers.

TABLE 4-continued

For downlink subframe i, in case of retransmission in the associated PUSCH subframe, if a transport block was disabled in the associated PUSCH subframe then ACK for that transport block shall be delivered to the higher layers.

A PHICH assignment procedure in the 3GPP LTE/LTE-A system will be briefly described hereinbelow. The present will be described based on the PHICH assignment procedure in the 3GPP LTE/LTE-A system.

TABLE 5

For PUSCH transmissions scheduled from serving cell in subframe n, a UE shall determine the corresponding PHICH resource of serving cell c in subframe n + kPHICH, where kPHICH is always 4 for FDD and is given in following table 6 for TDD. For subframe bundling operation, the corresponding PHICH resource is associated with the last subframe in the bundle.
The PHICH resource is identified by the index pair ($n_{PHICH}^{group}$, $n_{PHICH}^{seq}$) where $n_{PHICH}^{group}$ is the PHICH group number and $n_{PHICH}^{seq}$ is the orthogonal sequence index within the group as defined by:

$n_{PHICH}^{group} = I_{PRB\_RA} + n_{DMRS}) \bmod N_{PHICH}^{group} + I_{PHICH} N_{PHICH}^{group}$
$n_{PHICH}^{seq} = (\lfloor I_{PRB\_RA} / N_{PHICH}^{group} \rfloor + n_{DMRS}) \bmod 2N_{SF}^{PHICH}$ where
nDMRS is mapped from the cyclic shift for DMRS field (according to following table 6) in the most recent PDCCH with uplink DCI format[4] for the transport block(s) associated with the corresponding PUSCH transmission. nDMRS shall be set to zero, if there is no PDCCH with uplink DCI format for the same transport block, and if the initial PUSCH for the same transport block is semi-persistently scheduled, or if the initial PUSCH for the same transport block is scheduled by the random access response grant.
$N_{SF}^{PHICH}$ is the spreading factor size used for PHICH modulation as described in section 6.9.1 in [3].

$$I_{PRB\_RA} = \begin{cases} I_{PRB\_RA}^{lowest\_index} & \text{for the first } TB \text{ of a } PUSCH \text{ with associated } PDCCH \text{ or for the case of no associated } PDCCH \text{ when the number of negatively acknowledged } TBs \text{ is not equal to the number of } TBs \text{ indicated in the most recent } PDCCH \text{ associated with the corresponding } PUSCH \\ I_{PRB\_RA}^{lowest\_index} + 1 & \text{for a second } TB \text{ of a } PUSCH \text{ with the corresponding } PDCCH \end{cases}$$

where $I_{PRB\_RA}^{lowest\_index}$ is the lowest PRB index in the first slot of the corresponding PUSCH transmission,
$N_{PHICH}^{group}$ is the number of PHICH groups configured by higher layers as described in section 6.9 of [3], $$I_{PHICH} = \begin{cases} 1 & \text{for } TDD \; UL/DL \text{ configuration 0 with } PUSCH \text{ transmission in subframe } n = 4 \text{ or } 9 \\ 0 & \text{otherwise} \end{cases}$$

TABLE 6

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

Figure 3:
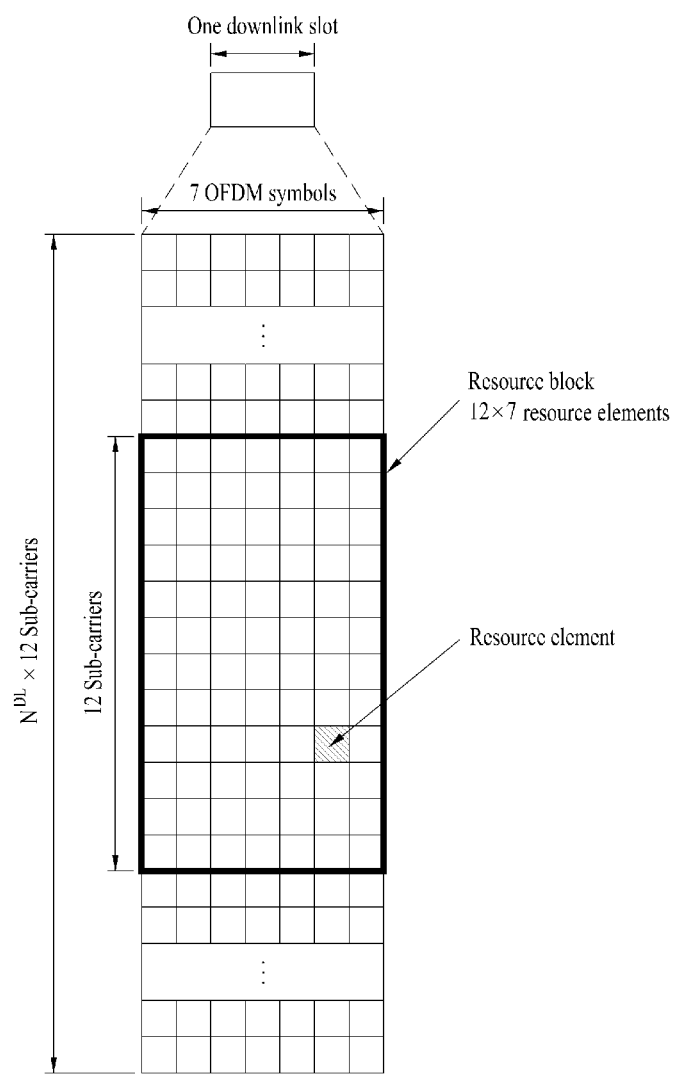
FIG. 3 is a diagram illustrating a resource grid of a downlink slot of a 3GPP LTE/LTE-A system as an exemplary wireless communication system.

FIG. 3 is a diagram illustrating a resource grid of a DL slot of a 3GPP LTE/LTE-A system as an exemplary wireless communication system.

Referring to FIG. 3, a DL slot includes a plurality of OFDM symbols in the time domain. One DL slot may include 7 (or 6) OFDM symbols and one RB may include 12 subcarriers in the frequency domain. Each element on the resource grid is referred to as a Resource Element (RE). One RB includes 12×7 (or 6) REs. The number of RBs, NRB, included in a DL slot depends on a DL transmission bandwidth. The structure of a UL slot is the same as the structure of a DL slot except that an OFDM symbol is replaced with an SC-FDMA symbol.

Figure 4:
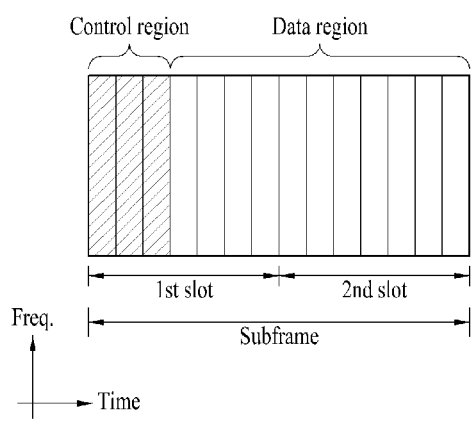
FIG. 4 is a diagram illustrating the structure of a downlink subframe used in a 3GPP LTE/LTE-A system as an exemplary wireless communication system.

FIG. 4 illustrates the structure of a DL subframe used in a 3GPP LTE/LTE-A system as an exemplary wireless communication system.

Referring to FIG. 4, up to three (or four) OFDM symbols at the start of the first slot of a subframe are used as a control region to which control channels are allocated and the remaining OFDM symbols of the subframe are used as a data region to which a PDSCH is allocated. DL control channels defined for LTE include a Physical Control Format Indicator Channel (PCFICH), a PDCCH, and a Physical Hybrid ARQ Indicator Channel (PHICH). The PCFICH is transmitted in the first OFDM symbol of a subframe, carrying information about the number of OFDM symbols used for transmission of control channels in the subframe. The PHICH delivers a Hybrid Automatic Repeat reQuest (HARQ) Acknowledgement/Negative Acknowledgement (ACK/NACK) signal as a response to UL transmission.

Control information carried on the PDCCH is called Downlink Control Information (DCI). Format 0 for UL and formats 1, 1A, 1B, 1C, 1D, 2, 2A, 3, and 3A for DL are defined as DCI formats. The DCI formats selectively include information such as a hopping flag, RB allocation, a Modulation and Coding Scheme (MCS), a Redundancy Version (RV), a New Data Indicator (NDI), Transmit Power Control (TPC), a cyclic shift, a Demodulation Reference Signal (DM RS), Channel Quality Information (CQI) request, a HARQ process number, a Transmitted Precoding Matrix Indicator (TPMI), and Precoding Matrix Indicator (PMI) confirmation, according to usage.

The PDCCH delivers information about a transport format and resource allocation for a Downlink Shared channel (DL-SCH), information about a transport format and resource allocation for an Uplink Shared Channel (UL-SCH), paging information of a Paging Channel (PCH), system information on the DL-SCH, information about resource allocation for a higher-layer control message such as a random access response transmitted on the PDSCH, a set of Tx power control commands for individual UEs of a UE group, Tx power control commands, Voice Over Internet Protocol (VoIP) activation indication information, etc. A plurality of PDCCHs may be transmitted in the control region. A UE may monitor a plurality of PDCCHs. A PDCCH is transmitted on an aggregate of one or plural consecutive Control Channel Elements (CCEs). A CCE is a logical allocation unit used to provide the PDCCH at a coding rate based on the state of a radio channel. The CCE includes a plurality of Resource Element Groups (REGs). The format of the PDCCH and the number of available bits for the PDCCH are determined according to the number of CCEs. A BS determines the PDCCH format according to DCI which is to be transmitted to a UE and attaches a Cyclic Redundancy Check (CRC) to control information. The CRC is masked by an identifier (ID) (e.g., a Radio Network Temporary Identifier (RNTI)) according to the owner or usage purpose of the PDCCH. If the PDCCH is destined for a specific UE, the CRC may be masked by a Cell-RNTI (C-RNTI) of the UE. If the PDCCH carries a paging message, the CRC thereof may be masked by a paging ID (e.g., a Paging-RNTI (P-RNTI)). If the PDCCH carries system information (particularly, a System Information Block (SIB)), the CRC thereof may be masked by a System Information RNTI (SI-RNTI). If the PDCCH is designated as a random access response, the CRC thereof may be masked by a Random Access-RNTI (RA-RNTI).

Figure 5:
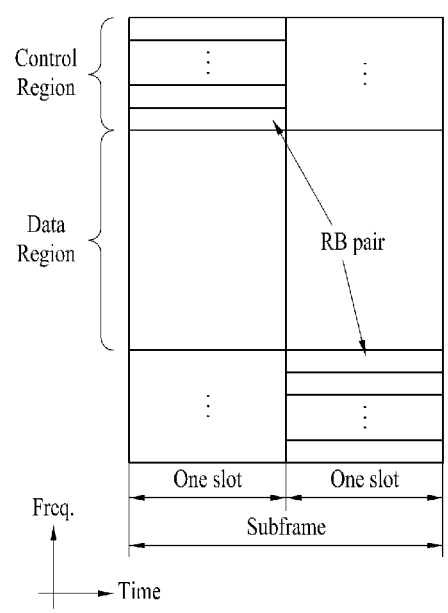
FIG. 5 is a diagram illustrating the structure of an uplink subframe used in a 3GPP LTE/LTE-A system as an exemplary wireless communication system.

FIG. 5 illustrates the structure of a UL subframe used in a 3GPP LTE/LTE-A system as an exemplary wireless communication system.

Referring to FIG. 5, a UL subframe includes a plurality of slots (e.g. 2 slots). A slot may include a different number of SC-FDMA symbols according to CP length. The UL subframe is divided into a control region and a data region in the frequency domain. The data region includes a PUSCH to transmit a data signal such as voice and the control region includes a PUCCH to transmit Uplink Control Information (UCI). The PUCCH occupies a pair of RBs at both ends of the data region in the frequency domain and the RB pair frequency-hops over a slot boundary.

The PUCCH may be used to deliver the following control information.

SR (Scheduling Request): SR is information requesting UL-SCH resources and is transmitted using On-Off Keying (OOK).

HARQ ACK/NACK: HARQ ACK/NACK is a response signal to a DL data packet received on a PDSCH, indicating whether the DL data packet has been successfully received. 1-bit ACK/NACK is transmitted as a response to a single DL codeword (CW) and 2-bit ACK/NACK is transmitted as a response to two DL CWs.

CQI (Channel Quality Indicator): CQI is feedback information regarding a DL channel. Multiple Input Multiple Output (MIMO)-related feedback information includes a Rank Indicator (RI), a Precoding Matrix Indicator (PMI), a Precoding Type Indicator (PTI), etc. The CQI occupies 20 bits per subframe.

The amount of UCI that the UE may transmit in a subframe depends on the number of SC-FDMA symbols available for transmission of control information. SC-FDMA symbols available for transmission of control information means the remaining SC-FDMA symbols except for SC-FDMA symbols used for transmission of RSs in a subframe. In a subframe in which a Sounding Reference Signal (SRS) is configured, the last SC-FDMA symbol of the subframe is also excluded in transmitting the control information. The RSs are used for coherent detection of the PUCCH. The PUCCH supports 7 formats according to transmitted information.

Figure 6:
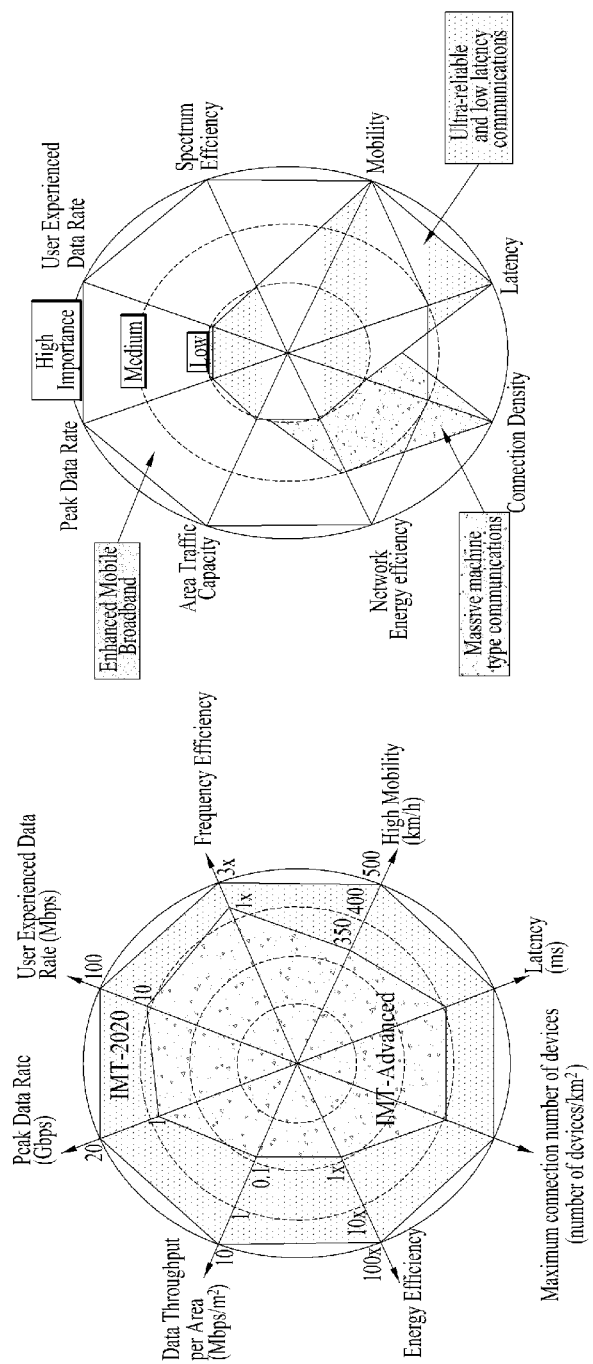
FIG. 6 is a diagram illustrating core performance requirements for 5G proposed in IMT 2020 and per-service scenario association with the 5G performance requirements on a per-service scenario basis.

FIG. 6 is a diagram for explaining IMT 2020 core performance requirements for 5G and association with the 5G performance requirements on a per-service scenario basis.

Particularly, uMTC Service has a very limited Over-The-Air (OTA) latency requirement and requires high mobility and high reliability (OTA latency: <1 ms, Mobility: >500 km/h, BLER: <$10^{-6}$).

Figure 7:
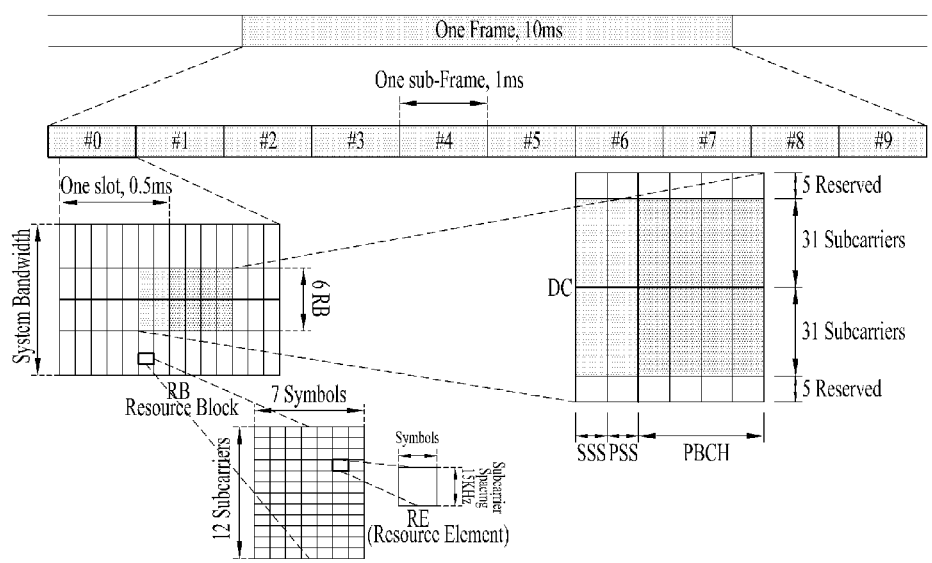
FIG. 7 is a diagram illustrating an LTE/LTE-A frame structure.

FIG. 7 is a diagram illustrating an LTE/LTE-A frame structure.

FIG. 7 illustrates the basic concept of an LTE/LTE-A frame structure. One frame includes 10 1-ms subframes each having a length of 10 ms. One subframe includes two 0.5-ms slots each having 7 OFDM (Orthogonal Frequency Division Multiplexing) symbols. One resource block (RB) is defined by 12 subcarriers with a subcarrier spacing of 15 kHz and 7 OFDM symbols. A BS transmits a Primary Synchronization Signal (PSS) and a Secondary Synchronization Signal (SSS) for synchronization, and a Physical Broadcast Channel (PBCH) for system information, in 6 RBs corresponding to a center frequency. The frame structure and the positions of signals and channels may vary depending on a normal/extended cyclic prefix (CP) and TDD/FDD.

Figure 8:
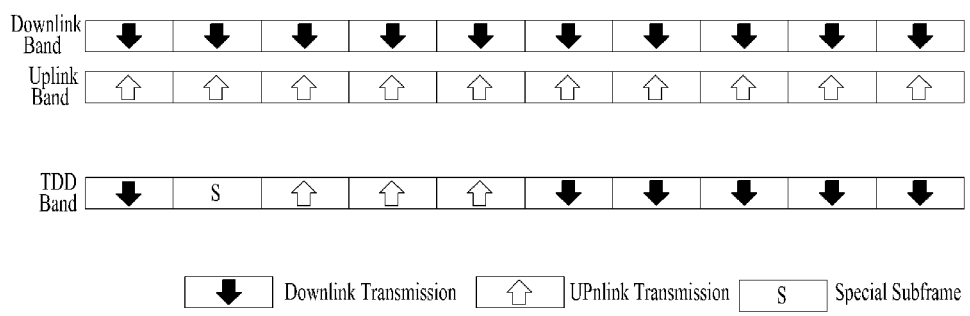
FIG. 8 is a diagram illustrating exemplary FDD and TDD frame structures in an LTE/LTE-A system.

FIG. 8 is a diagram illustrating exemplary FDD and TDD frame structures in an LTE/LTE-A system.

Referring to FIG. 8, in the FDD frame structure, a DL frequency band and UL frequency band are separate and, in the TDD frame structure, a DL region and a UL region are distinguished on a subframe basis within the same band.

Figure 9:
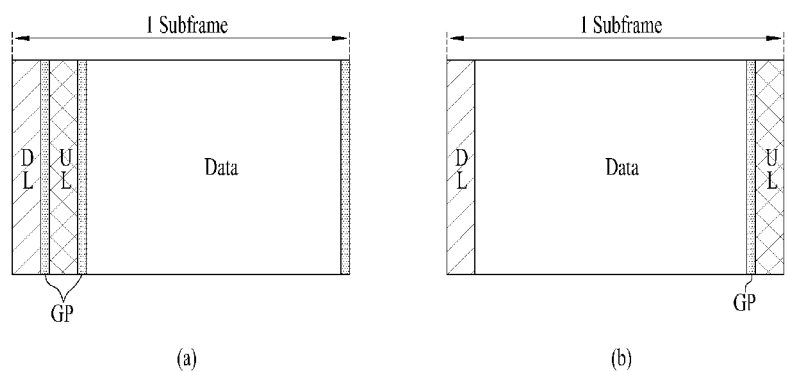
FIG. 9 is a diagram illustrating an exemplary self-contained subframe structure.

FIG. 9 is a diagram illustrating an exemplary self-contained subframe structure.

FIG. 9 illustrates self-contained subframe structures proposed to satisfy a low latency requirement among 5G performance requirements. According to a TDD-based self-contained subframe structure, a DL resource duration and a UL resource duration (e.g., a DL control channel and a UL control channel), a Guard Period (GP) for solving the problem of interference between DL and UL, and a resource duration for data transmission are present in one subframe.

(a) of FIG. 9 illustrates an exemplary frame structure in which a subframe is configured in the order of DL, UL, and data resource durations and a GP is interposed between resource durations. In (a) of FIG. 9, a DL resource duration represented as DL may be a resource duration for a DL control channel and a UL resource duration represented as UL may be a resource duration for a UL control channel.

(b) of FIG. 9 illustrates another exemplary fame structure in which a subframe is configured in the order of DL, data, and UL resource durations and a GP exists only before the UL resource duration. Similarly, in (b) of FIG. 9, a DL resource duration represented as DL may be a resource duration for a DL control channel and a UL resource duration represented as UL may be a resource duration for a UL control channel.

Full-Duplex Radio (FDR) is the technology of simultaneously performing transmission and reception on the same resource at a single node, thereby theoretically improving system capacity twice greater than that of the existing half-duplex communication using time or frequency resource by dividing the resource orthogonally.

Figure 10:
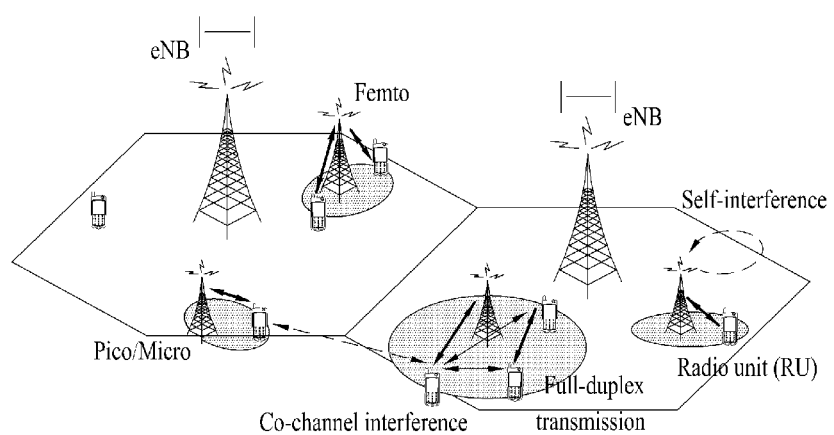
FIG. 10 shows the conceptual diagram of a user equipment and base station supportive of FDR.

FIG. 10 shows the conceptual diagram of a user equipment and base station supportive of FDR.

In the FDR situation shown in FIG. 10, total three types of interferences exist as follows.

Intra-device self-interference: As transmission and reception are performed with the same time and frequency resources, a signal transmitted by a device itself is simultaneously received as well as a desired signal. In this case, as the signal transmitted by the device itself barely has attenuation and is received by a Rx antenna of its own, it is received with power much greater than that of the desired signal, which means that it works as interference.

UE to UE inter-link interference: A UL signal transmitted by a UE is received by an adjacently located UE, thereby working as interference.

BS to BS inter-link interference: A signal transmitted between base stations or heterogeneous base stations (Picocell, femtocell, relay node) in HetNet situation is received by an Rx antenna of another base station, thereby working as interference.

Figure 11:
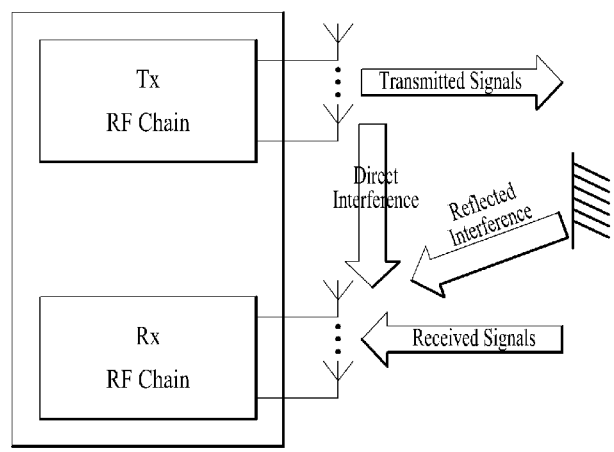
FIG. 11 is a conceptual diagram exemplarily showing Tx/Rx link and Self-Interference (SI) in FDR communication situation.

FIG. 11 is a conceptual diagram exemplarily showing Tx/Rx link and Self-Interference (SI) in FDR communication situation.

As shown in FIG. 11, Self-Interference (SI) may be categorized into direct interference that a signal transmitted from a Tx antenna directly enters an Rx antenna of its own without path attenuation and reflected interference that the signal is reflected by the surrounding terrain. And, a size of the SI is extremely larger than that of a desired signal due to a physical distance difference. Due to the intensity of the extremely large interference, effective cancellation of self-interference is required for the drive of FDR system.

In order to effectively drive the FDR system, requirements of Self-Interference Cancellation (Self-IC) according to maximum transmission power of a device may be determined as Table 7 (Self-IC requirements (BW=20 MHz) up FDR application in a mobile communication system).

Referring to Table 7, it can be observed that Self-IC performance of 119 dBm is necessary in order for a User Equipment (UE) to effectively drive an FDR system on a BandWidth (BW) of 20 MHz. A thermal noise value may change into $N_{0,BW}=-174$ dBm+$10 \times \log_{10}$(BW) depending on a bandwidth of a mobile communication system, and Table 7 was found on the assumption of a bandwidth of 20 MHz. Regarding Table 7, Receiver Noise Figure (NF) considers a worst case by referring to 3GPP specification requirements. A receiver thermal noise level is determined as a sum of thermal noise and receiver NF on a specific BW.

Figure 12:
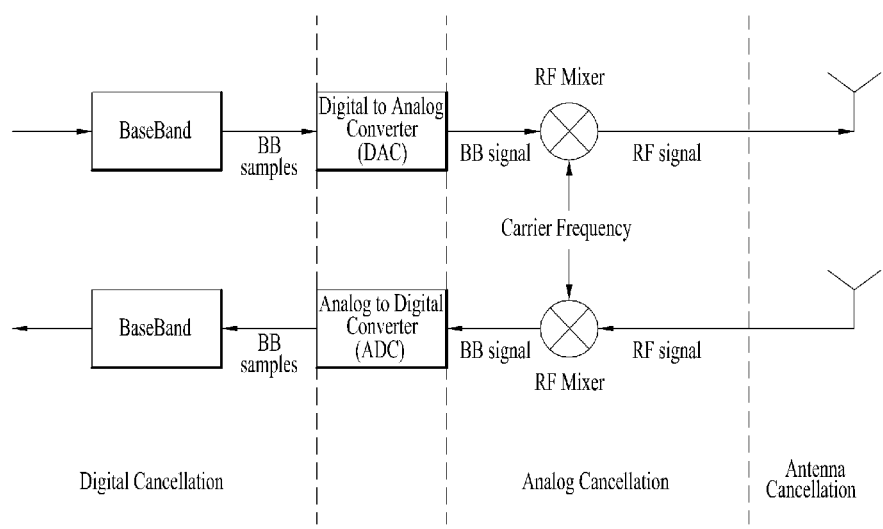
FIG. 12 is a diagram showing positions for applying there kinds of interference schemes in an RF Tx/Rx stage (or RF front stage) of a device.

Types of Self-Interference Cancellation (Self-IC) Schemes and Application Methods FIG. 12 is a diagram showing positions for applying there kinds of interference schemes in an RF Tx/Rx stage (or RF front stage) of a device. In FIG. 12, application positions of three kinds of Self-IC schemes are illustrated. Hereinafter, the three kinds of Self-IC schemes are schematically described.

Antenna Self-IC: a Self-IC scheme supposed to be executed most preferentially among all Self-IC schemes is an antenna Self-IC scheme. SI cancellation is performed in an antenna stage. Most simply, a portion of an SI signal can be cancelled in a manner of physically cutting off a transfer of the SI signal by installing an object capable of cutting off a signal between a Tx antenna and an Rx antenna, artificially adjusting an inter-antenna distance by utilizing multiple antennas, or giving phase inversion to a specific Tx signal. Moreover, a portion of an SI signal may be cancelled by utilizing multiple polarized antennas or a directional antenna.

Analog Self-IC: This is a scheme of cancelling an SI signal using an analog signal copied by a scheme of cancelling interference in an analog stage before a received signal passes through Analog-to-Digital Converter (ADC). This may be performed in an RF or IF region. A method of cancelling an SI signal is described in detail as follows. First of all, a copy signal of an actually received SI signal is generated in a manner of time-delaying a transmitted analog signal and then adjusting an amplitude and phase of the signal and then subtracted from a signal received through an RX antenna. Yet, since it is processed using the analog signal, additional distortion may occur due to implementation complexity and circuit characteristics, which is disadvantageous in that interference cancellation performance may be changed considerably.

Digital Self-IC: This is a scheme of cancelling interference after a received signal has passed through ADC and includes all interference cancellation schemes performed in a baseband region. Most simply, it can be implemented in a manner of making a copy signal of SI using a transmitted digital signal and then subtracting it from a received digital

TABLE 7

| Node Type | Max. Tx Power ($P_A$) | Thermal Noise. (BW = 20 MHz) | Receiver | Receiver Thermal Noise Level | Self-IC Target ($P_A$ - TN-NF) |
|---|---|---|---|---|---|
| Macro eNB | 46 dBm | −101 dBm | 5 dB (for eNB) | −96 dBm | 142 dB |
| Pico eNB | 30 dBm | | | | 126 dB |
| Femto eNB, WLAN AP | 23 dBm | | | | 119 dB |
| UE | 23 dBm | | 9 dB (for UE) | −92 dBm | 115 dB | signal. Alternatively, schemes for preventing a transmitted signal of a UE or BS from being received through an Rx antenna in a manner of performing precoding/postcoding on a baseband using multiple antennas may be classified as Digital Self-IC. However, Digital Self-IC is possible if a digitally modulated signal is quantized enough to reconstruct information on a desired signal. Thus, in order to perform Digital Self-IC, it is necessary to premise condition that a signal power level difference between an interference signal, which remains after cancelling interference using at least one of the above schemes, and a desired signal should enter an ADC range.

Figure 13:
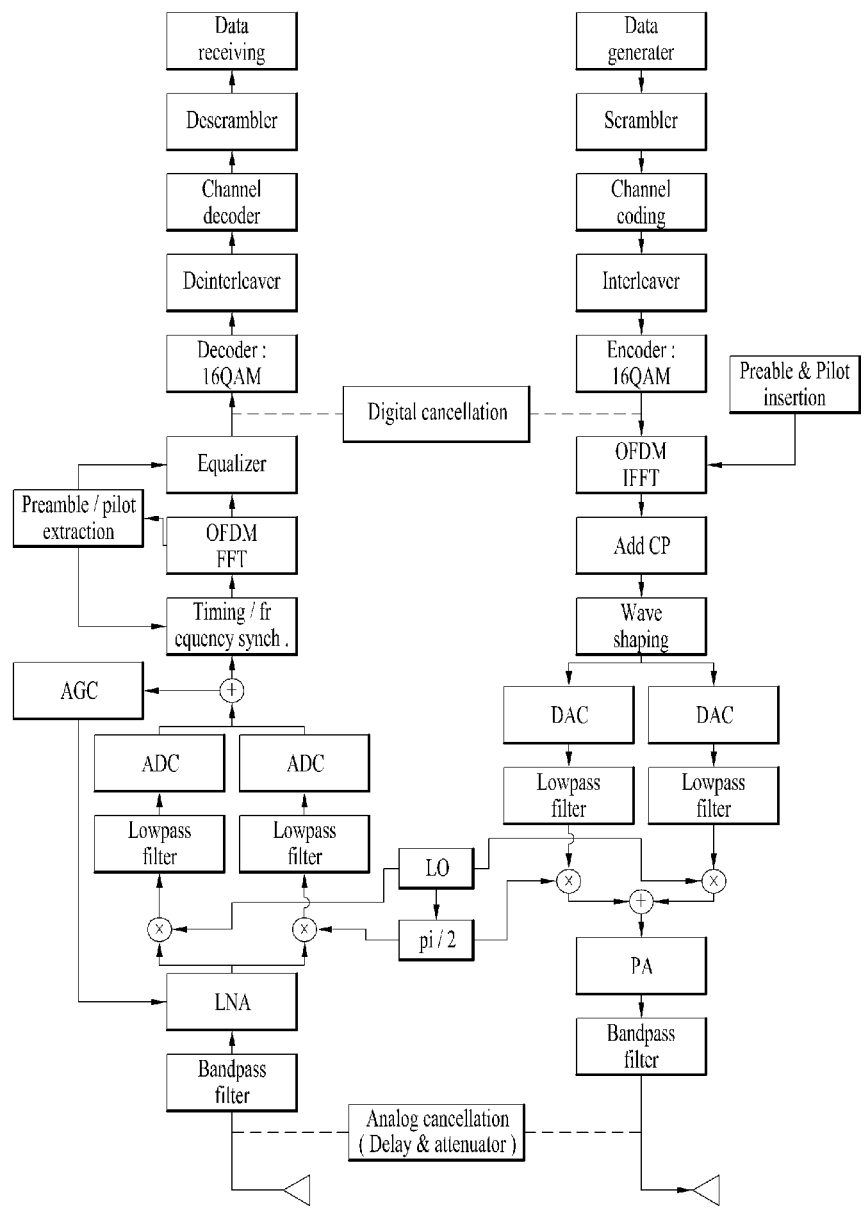
FIG. 13 is a block diagram diagrammatizing a device for Self-Interference Clearance (SelfIC) in a communication device proposed in a communication system environment using OFDM based on FIG. 12.

FIG. 13 is a block diagram diagrammatizing a device for Self-Interference Cancellation (Self-IC) in a communication device proposed in a communication system environment using OFDM based on FIG. 12.

Regarding a location of a Digital Self-IC block, although FIG. 13 shows that it is performed directly using digital SI signal information before DAC and digital SI signal information after ADC, it may be performed using a digital SI signal after IFFT and a digital SI signal before FFT. In addition, although FIG. 13 is the conceptual diagram showing that a SI signal is cancelled by separating a Tx antenna and an Rx antenna from each other, antenna configuration may be different that of FIG. 13 in case of using an antenna interference cancellation scheme using a single antenna.

Figure 14:
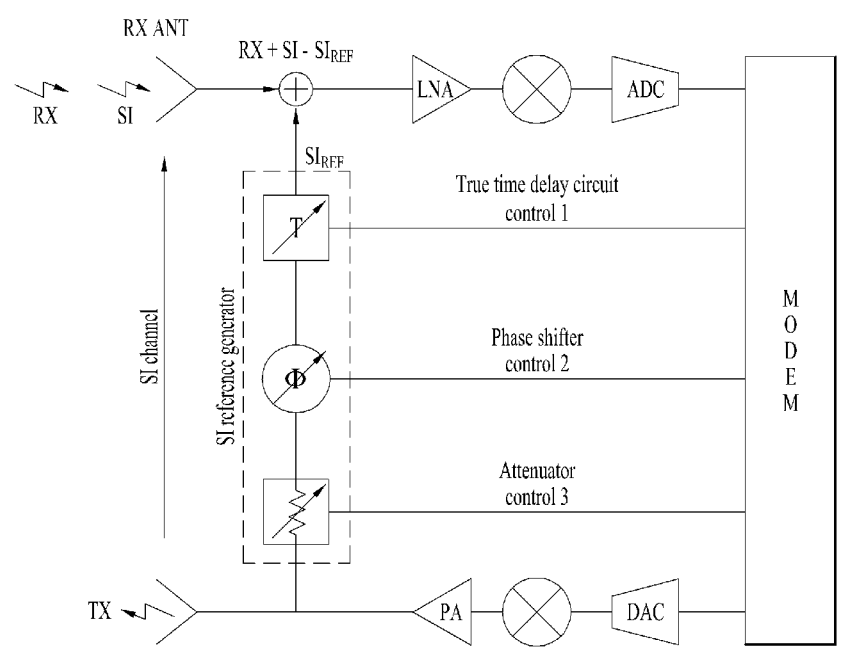
FIG. 14 is a diagram showing an RF chain of a communication device for performing general Full Duplex Radio (FDR) technology.

FIG. 14 is a diagram showing an RF chain of a communication device for performing general Full Duplex Radio (FDR) technology.

In order to cancel an SI signal in a communication device using FDR, it is necessary to generate a copy signal (hereinafter, SI interference signal) exactly identical to the SI signal. Referring to FIG. 3, for the cancellation of an SI signal, a method of subtracting an SI reference signal $SI_{REF}$ from an SI signal (SI) before LNA of an Rx stage of an RX chain is used in general. In this case, in order to generate the SI reference signal $SI_{REF}$ in the communication device, a Tx signal of a Tx stage is diverged (e.g., a case of diversion after PA in the Tx stage is shown in FIG. 3) and a portion of the Tx signal is then set to pass through an SI reference generator including an attenuator, a phase shifter and a true time delay circuit. The SI reference generator generates an SI reference signal to imitate an SI channel using the diverged Tx signal. In doing so, in order for the SI reference generator to imitate the SI channel, a channel into which the SI signal is put is estimated separately.

The communication device may estimate the SI channel and then generate a control signal inputted to the true time delay circuit, a control signal inputted to the phase shifter, and a control signal inputted to the attenuator. In this case, an SI reference signal path and a desired Rx signal should be in a state of not coming in entirely.

As a method for a communication device to control an SI reference generator, there may be two kinds of methods.

According to a first method, in order to separately estimate an SI signal incoming channel, a communication device stops communication and transmits an SI channel estimation signal (e.g., pilot signal, reference signal, etc.) on an allocated communication band (or a channel band) and an SI reference generator may imitate an SI signal upon communication using information of the SI channel estimation signal.

According to a second method, a communication device may transmit an SI signal channel estimation signal (e.g., reference signal, pilot signal, tone, etc.) carried on both ends (e.g., guard band) of a communication channel band and control an SI reference generator in a direction that the corresponding SI signal channel estimation signal is reduced according to an adaptive feedback algorithm.

In the first method, to find an optimized state of the SI reference generator, it is necessary to estimate an SI channel. To this end, a Tx device (or a Tx side) and an Rx device (or an Rx side) should stop communication as well. Moreover, even though perfect SI channel estimation is performed, it is necessary to calibrate a channel of an SI reference path very precisely. The channel of the SI reference path needs to become a lookup table based on the combination of all control voltages. Although an accurate lookup table is written with specific Tx power and temperature, it is supposed to change depending on an original Tx power and a temperature of circuit. Hence, SI signal cancellation performance is inevitably degraded due to a difference between a current Tx power and temperature and a condition at the timing of preparing the lookup table. Moreover, there is a disadvantage that it is unable to follow an SI signal channel (or an SI channel) that changes depending on a time.

Regarding the second method, as a communication device can transmit an SI signal channel estimation signal (tone, pilot signal, reference signal, etc.) carried on both communication band sides without stopping communication and controls an SI reference generator time-continuously using adaptive feedback algorithm, calibration of the SI reference generator is unnecessary. However, as the SI reference generator is controlled using a tone of a guard band on both communication band sides instead of a communication band, it is disadvantageous in that an SI signal attributed to a transmission of a tone inside the communication band, which is most important, is not cancelled.

Figure 15:
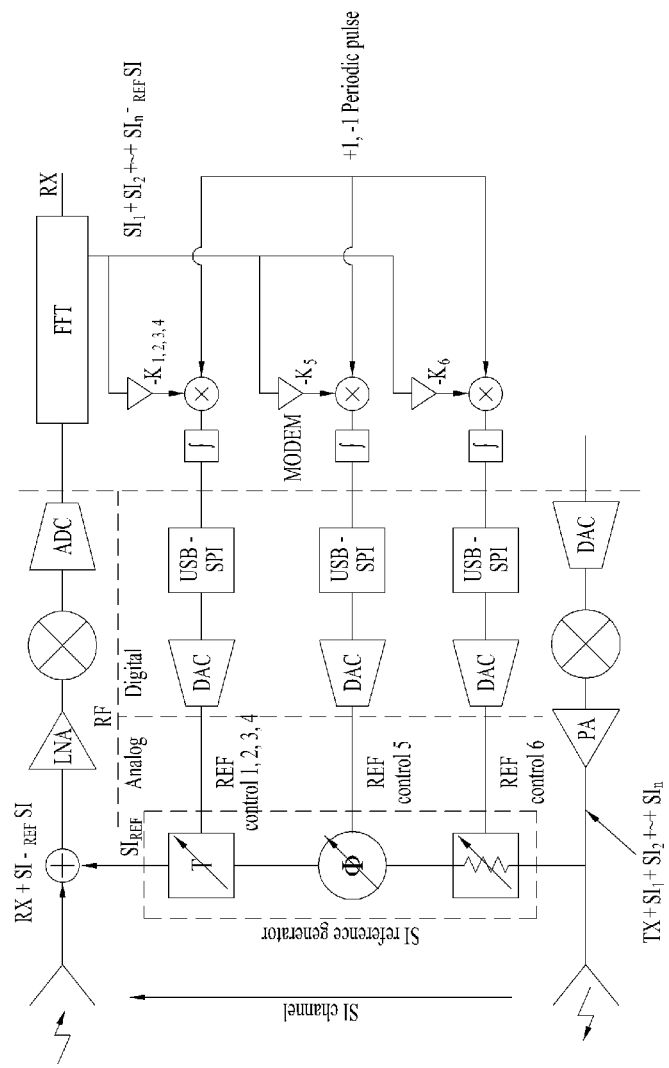
FIG. 15 is a diagram showing one example of an RF chain structure of a communication device for self-interference signal cancellation in using FDR.

FIG. 15 is a diagram showing one example of an RF chain structure of a communication device for self-interference signal cancellation in using FDR.

Referring to FIG. 15, an RF chain of a communication device may include a communication modem (or a modem), an SI reference generator, a transmission (Tx) antenna, a reception (Rx) antenna, etc. The communication modem may include a Fast Fourier Transform (FFT) unit and integrators. The SI reference generator may include an attenuator, a phase shifter, and a true time delay circuit.

To generate (or copy) a fine SI reference signal, the SI reference generator may control the attenuator, the phase shifter and the true time delay circuit using an analog manner. To this end, the RF chain may include a Digital to Analog Converter (DAC) configured to convert a control signal transmitted from the communication modem (or modem) into an analog signal.

According to the concept of the true time delay circuit (true time delay) defined as a slope of phase shift to frequency band basically, as it is unable to control a true time delay with information on a single frequency only, it is necessary to obtain information on at least two frequencies in order to perform SI signal cancellation on a wide band. Therefore, it is assumed to transmit two or more pilot signals, two or more reference signals, two or more tones, or the like, which are test signals.

In order to control the SI reference generator, how to use multiple reference signals (or, multiple tones, multiple pilot signals, etc.), which are test signals, is described. First of all, the communication model (or modem) shown in FIG. 15 may monitor a sum of powers of multiple tones at the frequencies where the multiple tones are located as test signals, measure the powers at the frequency positions where the multiple tones are transmitted, respectively, and then calculate the sum of the measured powers. Here, the power measured at the frequency position of the transmitted tone corresponds to the power of the SI signal.

The communication modem may transmit a control signal to minimize a difference between the power sum of SI signals attributed to multiple tones and the power of an SI reference signal. Namely, the communication modem may feed a control signal, which is to minimize the sum of the powers of the SI signals attributed to the multiple tones, back to the SI reference generator. The SI reference generator generates an SI reference signal according to the fedback control signal. To cancel the measured power sum of the SI signals, the communication modem may generate an SI reference signal having a power of a value closest to the power sum.

The communication modem may control the SI reference generator until the power sum (SI=SI1+SI2+SI3+ . . . +SIn) is minimized using the adaptive feedback loop. Here, Sin is a power of an SI signal measured at a frequency position where an $n^{th}$ reference signal among a plurality of reference signals is transmitted. The communication modem uses a periodic pulse signal of +1 and −1 to change a sign of an increment of a bias voltage controlled by a loop function of adaptive feedback. The loop function means a function for searching surroundings of a current variable in a feedback loop including a variable to control.

The communication modem may feed a control signal back to each of the phase shifter, the attenuator and the true time delay circuit using an adaptive feedback loop so as to enable the SI reference generator to generate an SI reference signal having a power closest to a power sum of SI signals.

As a method of controlling SI reference signal generation according to FIG. 15 operates adaptive feedback algorithm with the power sum of multiple tones, it is advantageous in that complicated channel estimation, calibration and the like are unnecessary.

Figure 16:
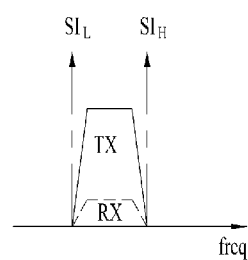
FIG. 16 is a diagram exemplarily showing two tones transmitted on both communication band sides to control a self-interference reference signal generator.
Figure 17:
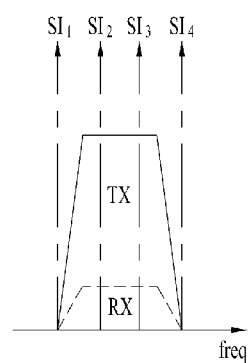
FIG. 17 is a diagram exemplarily showing multiple tones transmitted on a communication band to control a self-interference reference signal generator proposed by the present disclosure.

FIG. 16 is a diagram exemplarily showing two tones transmitted on both communication band sides to control a self-interference reference signal generator, and FIG. 17 is a diagram exemplarily showing multiple tones transmitted on a communication band to control a self-interference reference signal generator proposed by the present disclosure.

FIG. 17 exemplarily shows the two tone system that a communication device transmits tones on both sides (e.g., guard band) of an allocated communication band, respectively. As shown in FIG. 17, since two tones are transmitted on the guard band instead of a data transmitted band, transmission efficiency is good advantageously. However, there is a problem that an SI signal due to data transmitted within the communication band cannot be cancelled.

Figure 18:
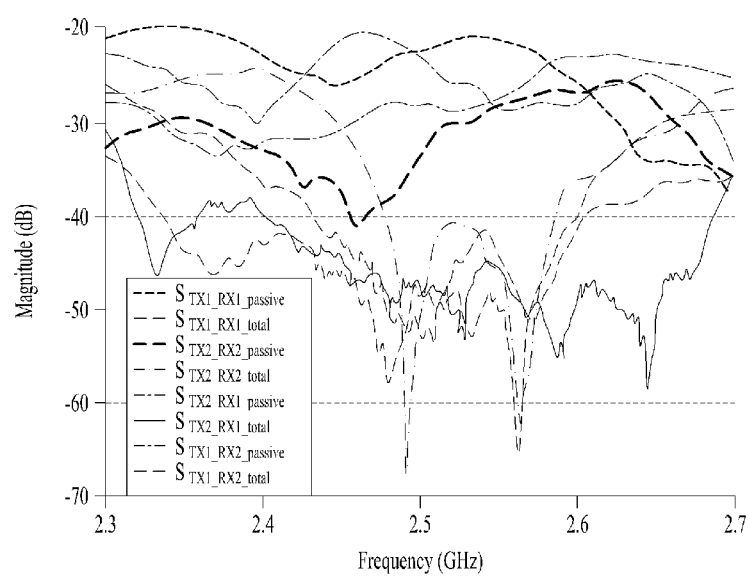
FIG. 18 is a diagram showing cancellation performance of a self-interference signal upon controlling a self-interference reference signal generator in a manner of transmitting two tones on both communication band sides like FIG. 16.
Figure 19:
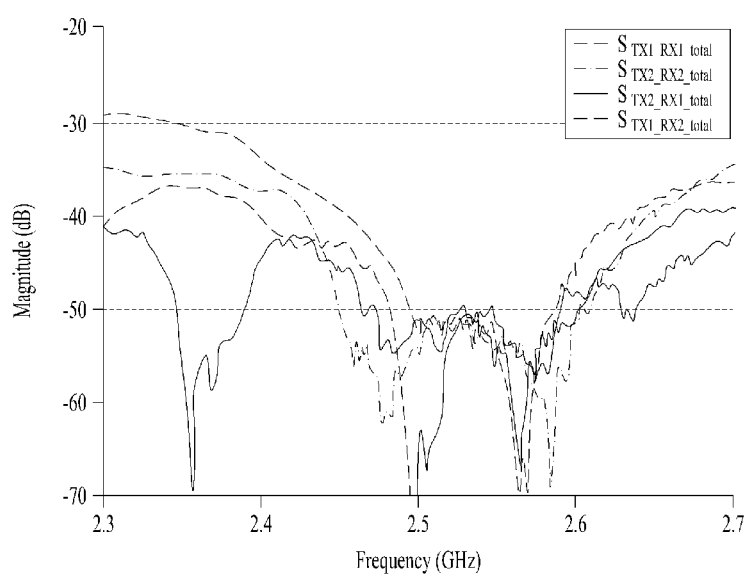
FIG. 19 is a diagram showing cancellation performance of a self-interference signal upon controlling a self-interference reference signal generator in a manner shown in FIG. 17.

FIG. 18 is a diagram showing cancellation performance of a self-interference signal upon controlling a self-interference reference signal generator in a manner of transmitting two tones on both communication band sides like FIG. 16, and FIG. 19 is a diagram showing cancellation performance of a self-interference signal upon controlling a self-interference reference signal generator in a manner shown in FIG. 17.

In case of activating adaptive feedback by the multi-tone transmission scheme shown in FIG. 17 proposed by the present disclosure, it is experimentally confirmed that there is a definite difference in SI signal cancellation performance across an inside of a communication band. Four multi-tones may be utilized like FIG. 17 for example. Generally, if the number of tones increases, SI cancellation performance is improved. However, a frequency band unusable for communication increases disadvantageously.

FIG. 18 is a test result showing cancellation performance of an SI signal when an SI reference generator is controlled in a manner of transmitting two tones on both sides of a communication band. A dotted line denotes a power level of an SI signal before cancellation of the SI signal and a solid line denotes a power level after the SI signal cancellation.

Referring to FIG. 18, it can be observed that an SI signal is not cancelled well at 2.5 GHz that is a center frequency of a communication band and that the SI signal is cancelled well at the edges of both band sides at which two tones are located.

On the contrary, FIG. 19 is a test result showing cancellation performance of an SI signal when an SI reference generator is controlled in a manner of multi-tone transmission proposed by the present disclosure.

Referring to FIG. 19, it can be confirmed that an SI signal is cancelled across the whole communication band centering on the center frequency of 2.5 GHz. Thus, it can be observed that a case of transmitting multiple tones within a communication band has SI cancellation performance better than that of a case of running an adaptive feedback loop with tones on both band sides.

In order that the tones for controlling the SI reference generator like FIG. 17 avoid causing hindrance to communication, a Tx device informs an Rx device of information on the frequency at which the tones for controlling the SI reference generator are located, whereby such information needs to be shared in between. In case of OFDMA, a subcarrier allocated to data may be substituted with a tone or signal for the control of the SI reference generator or emptied. A Tx stage of a node for driving FDR performs transmission in a manner of substituting a specific carrier with a tone for the control of an SI reference generator instead of the existing data. In case of a far-end node (e.g., a node intending to transmit a desired signal to a node for driving FDR), transmission is performed by puncturing data to a subcarrier corresponding to a tone for the control of the SI reference generator.

To this end, the FDR node may forward a tone position for the control of the SI reference generator to a counterpart node through signaling. For example, in case that a base station is an FDR node, it is able to signal a position for the control of the SI reference generator to a UE corresponding to a counterpart node through Physical Downlink Control CHannel (PDCCH) or Physical Downlink Shared CHannel (PDSCH). For another example, when a UE is an FDR node and a counterpart node is a base station, the UE may signal a location of a tone for the control of the SI reference generator to the base station through Physical Uplink Control CHannel (PUCCH) or Physical Uplink Shared CHannel (PUSCH). If a power of the tone for the control of the SI reference generator is greater than a strength of a signal received from the far-end node by a specific value or more upon the reception of the FDR node driven in FDR mode, signaling of the position of the tone for the control of the SI reference generator may be stopped. Namely, only if the power of the tone for the control of the SI reference generator is smaller than the strength of the signal received from the far-end node by the specific value or more upon the reception of the FDR node driven in FDR mode, the signaling of the position of the tone for the control of the SI reference generator can be performed.

In addition, the number and positions of subcarriers substituted according to the control of the SI reference generator may be changed. Since the multiple tones used in the present disclosure are provided for power measurement of an SI signal at the corresponding frequency, they may have a prescribed continuous signal form (e.g., Sinc, etc.) within a subcarrier band. In this case, signal processing load is advantageously small in comparison to transmitter-receiver channel measurement performed in general communication.

Hereinafter, when a UE enables active RF SIC (self-interference cancellation) to operate in FDR mode, a method for the UE to forward information, which is related to SI reference signal transmission to effectively support such enablement, to a base station according to the present disclosure is described. The UE may determine the necessity of Reference Signal (RS) transmission and transmit information (e.g., RS necessary indication, ON/OFF indication for periodic SI, time and frequency positions (offset) of RS for SI, etc.) for the RS transmission to the base station through Physical Uplink Control CHannel (PUCCH) or Physical Uplink Shared CHannel (PUSCH).

For the active RF SIC, the UE may transmit a plurality of tones for RS transmission at time/frequency resource location including a communication band periodically or in response to a request. For such an operation, signaling defined between the UE and the base station is necessary. In addition, as interference may be caused to an adjacent UE upon UE's RS transmission, it is necessary to distinguish RS between UEs.

Proposal 1

A Base Station (BS) may inform a UE of RS configuration information determined for UE's Self-Interference Cancellation (SIC) (e.g., analog SIC) through predefined signaling.

In order to measure an SI signal in an analog domain, the UE may obtain the RS configuration information in advance. The RS configuration information may include information indicating a resource location of RS. For example, period information of RS, location offset information of RS located slot (or subframe), location or offset information of RS located symbol, and RS located frequency location or offset information may be included. In order for the UE to obtain the predefined RS configuration information, the BS may inform the UE of the information through predefined signaling. The RS configuration information may be cell-specific, group-specific, or UE-specific. A case of 'group-specific' may mean that several UEs are grouped and include a set of UEs located in the same serving cell or a set of UEs located in different serving cells, respectively. The grouping of UEs may be performed based on UE locations and an interference channel generated between UEs.

Proposal 1-1

As a specific proposal for the matter of Proposal 1, the predefined signaling may include Radio Resource Control (RRC) signaling.

A BS may transmit cell-specific RS configuration information, group-specific RS configuration information, and UE-specific RS configuration information to a UE by signaling. UE ID, group ID or cell ID may be included in the RS configuration information to inform the UE.

Proposal 1-2

As a specific proposal for the matter of Proposal 1, the predefined signaling may include Downlink Control Information (DCI) dynamically transmitted. A BS explicitly informs a prescribed UE that which resource is a resource for RS. The transmitted information may include cell-specific RS configuration information, group-specific RS configuration information, and UE-specific RS configuration information. UE ID, group ID or cell ID may be included in the RS configuration information.

Proposal 1-3

As a specific proposal for the matter of Proposal 1, the predefined signaling may include group common Physical Downlink Control CHannel (PDCCH). A BS may broadcast cell-specific RS configuration information, group-specific RS configuration information, and UE-specific RS configuration information through the group common PDCCH, which means to explicitly inform UEs of a prescribed group that a prescribed resource is for RS. The transmitted information may include cell-specific RS configuration information, group-specific RS configuration information, and UE-specific RS configuration information. UE ID, group ID or cell ID may be included in the RS configuration information.

Proposal 2

A BS may give indication of RS validation and actual measurement for Self-Interference Cancellation (SIC) (e.g., analog SIC) to a UE.

The BS may inform the UE of a location of RS through Proposal 1. Yet, for the power saving of the UE, the BS may indicate whether to turn off validation of RS or to perform measurement at a specific timing. This method is disclosed in the following specific proposals.

Proposal 2-1 (Implicit Method)

As described in Proposal 1-1, a BS may inform a UE of RS configuration information in advance through predefined signaling, thereby and enabling the UE to know that the corresponding RS configuration information is valid if a specific condition is met, and perform actual measurement of RS.

The UE is aware of a resource location of an RS and may perform SI measurement through the corresponding RS. Yet, if all Ues perform SI measurement of a plurality of RSs every time, it may be disadvantageous from the perspective of power. Hence, if a specific condition is met like the above proposal (e.g., when a transmission direction of a serving cell is FDR mode and/or a transmission direction of an adjacent cell is FDR mode and/or an intended transmission direction is DownLink (DL) or UpLink (UL)), the UE is aware that the corresponding RS configuration information is valid and may be allowed to perform actual SI measurement.

If the serving cell signals transmission direction information of adjacent cell(s) to the UE, it may enable the UE to implicitly recognize that the corresponding RS configuration is valid only if the transmission direction of the serving cell is FDR mode and the transmission direction of the adjacent cell is FDR or DL, and to perform actual SI measurement. This is because accuracy of RS may be lowered if the adjacent cell is UL. In case that the adjacent cell is DL, it may assume that venous cross-link interference management schemes are used already in an FDR cell in consideration of inter-UE interference caused to a UE of an adjacent BS.

If the serving cell signals the intended transmission direction information to the UE, only if the intended transmission direction is DL and the transmission direction of the serving cell is FDR mode, the UE may implicitly recognize that the corresponding RS configuration is valid and be allowed to measure RS.

The UE may be enabled to implicitly recognize that the corresponding RS configuration is valid only if the transmission direction of the serving cell is FDR mode and the transmission direction of the adjacent cell is FDR or DL, and to perform actual SI measurement. This is because accuracy of RS may be lowered if the adjacent cell is UL. In case that the intended DL/UL transmission direction is DL, it may assume that various cross-link interference management schemes are used already in an FDR cell in consideration of inter-UE interference caused to a UE of an adjacent BS.

Proposal 2-2 (Explicit Method)

A BS may inform a UE that RS configuration information is valid through predefined signaling (e.g, the existing or new DCI) and instruct the UE to perform measurement of SI on a corresponding RS resource.

The UE is already aware of a location of the RS resource and may perform SI measurement through the corresponding RS. Yet, if all UEs perform SI measurement on a plurality of RSs everytime, it may be disadvantageous from the perspective of power. Hence, like Proposal 2-2, the BS may indicate that the corresponding RS configuration information is valid through predefined signaling (e.g., DCI) and instruct the UE to perform actual SI measurement. The BS may additionally inform the UE of RS configuration information valid time, frequency location information of RS and the like through the predefined signaling (e.g., DCI). Namely, it means that a valid RS among a plurality of RSs can be indicated distinctively. The explicit indication may be transmitted on PDCH or PDSCH.

A field indicating that RS is valid in Proposal 1 may be added in the existing DCI. The corresponding value may be as follows. For example, in the corresponding field, '0' may indicate that all RSs for SI measurement are invalid. In the corresponding field, '1' may indicate that all RSs for SI measurement are valid, indicate to perform SI measurement, and indicate RF SIC adaptation and report.

In the existing DCI, a field indicating that RS is valid in Proposal 1 and/or frequency location information of RS may be included additionally. The corresponding value may be as follows. For example, '00' may indicate that all RSs for SI measurement are invalid. '01' may indicates that RS for tier 1 SI measurement is valid and that the rest RSs are unavailable. '10' may indicate that RS for tier 2 SI measurement is valid and that the rest RSs are unavailable. '11' may indicate that all RSs for SI measurement are valid, indicate to perform SI measurement, and indicate RF SIC adaptation and report. Here, the distinction between tier 1 and tier 2 may be changed by a transmission direction of an adjacent cell, which may be determined already.

Proposal 3

A UE may report SI information measured using RS and a presence or non-presence of the necessity for adaptive SI measurement to a serving cell periodically or aperiodically. The UE may perform SI measurement using a determined or indicated RS and report a residual SI measurement value and an RS index to a BS by paring them. In doing so, the reporting may be performed using a periodic and/or aperiodic method.

Proposal 3-1 (Periodic Reporting Method)

A UE may report a measured residual SI measurement value to a BS only if the measured residual SI measurement value is greater than a preset threshold, or report it to the BS periodically all the time irrespective of the above condition. The UE may transmit a strength (e.g., RSRP value) of the measured residual SI measurement value to the BS through PUCCH or PUSCH according to a given period value. Yet, in order to reduce UE's power consumption, the UE may transmit the residual SI measurement value to the BS in the given period only if the residual SI measurement value is greater than the preset threshold. Otherwise, the UE may not transmit the residual SI measurement value. In this case, the UE may determine whether to transmit the residual SI measurement value to the BS. In doing so, a value to be transmitted to the BS may include a difference from a previously measured/reported value or a measured value intact.

Proposal 3-2 (Aperiodic Reporting Method)

As an aperiodic reporting method, only if a residual SI measurement value is greater than a preset threshold, a UE may report it to a BS. Or, in case that a preset threshold error is generated in comparison to a previously measured/reported value, the UE may be allowed to report it.

The UE may report a residual SI measurement value to the BS by making a request to the BS based on event-triggering instead of transmitting a measured residual SI measurement value to the BS through PUCCH or PUSCH according to a given period. Namely, only if the residual SI measurement value is greater than the preset threshold in the given period, the UE may transmit it to the BS. Or, in comparison to a previously measured/reported value, in case that a preset threshold error is generated in between, the UE may report it by a making a request to the BS.

Proposal 3-3

Upon transmission to a BS, a UE may report M higher measurement informations (or highest or average measurement information) together with a linked RS configuration index.

When the UE reports a residual SI measurement value to the BS periodically or aperiodically, it may report all SI measurement results or a specific subset. For example, by reporting M measurement informations together with an RS configuration index, the BS may implicitly obtain whether interference of a prescribed frequency region is strong.

Proposal 4

In case that a UE performs periodic SI measurement using RS, a BS may give an indication of 'enabled' or 'disabled' of periodic measurement to the UE in a specific situation.

In case of performing SI measurement periodically, there may be no gain of the measurement in a specific situation. Instead, if the UE reports an incorrect measurement result to the BS, it becomes incorrect resource allocation, whereby performance may be lowered than the previous. Therefore, in case of a UE meeting a specific condition (e.g., in case of using Half Duplex Radio (HDR) Tx mode, in case of non mobility for the time being, in case of a UE making transmission with low power by being located at the center of a cell, in case of a UE necessary to reduce power consumption), it is necessary to adjust 'enable' and 'disable' of the periodic SI measurement. The following is to propose a method of 'enabling' and 'disabling' of periodic SI measurement.

Proposal 4-1 (Implicit Indication Method)

When a UE determines that a specific condition is met, it may not make a report to a BS without performing SI measurement. To support this, a basis for the UE to determine that the specific condition is met is necessary. For example, speed information may be obtained with the help of a GPS sensor of the UE. A case that a strength of a residual SI signal is qual to or smaller than a specific threshold, a case that the strength is greater than a strength of a signal received from a far-end node by a specific value or less, a case that a low power mode is entered, and the like may be possible.

When the above-disclosed method is used, a BS is not aware whether the UE determined not to make a residual SI measurement report. Yet, if the residual SI measurement report is not received in a determined period consecutively or a plurality of reports are not received, the BS will be aware that the UE determined not to make a residual SI measurement reporting.

Proposal 4-2 (Explicit Indication Method)

When a UE or BS satisfies the above-disclosed specific condition, the BS may inform the UE of a signal for disabling periodic SI measurement through predefined signaling.

A basis for the BS to determine that a specific condition is met is necessary. For example, when a residual SI (signal) measurement value is equal to or smaller than a specific threshold, if information indicating that the measurement value is greater than a strength of a signal received from a far-end node by a specific value or less, the BS may instruct the UE not to perform the SI measurement. For this instruction, the BS may signal information indicating that RS is invalid to the UE. In addition, the BS may inform the UE of information indicating that it is invalid during a specific time in a period only together with a specific time value.

Proposal 5

When a UE is a node in FDR mode, the UE may explicitly transmit information on a resource location of a tone (or RS, pilot signal, etc.) for the control of an SI reference generator to a BS through PUCCH, PUSCH or the like.

If block NACK is generated from a specific subband due to high SI, the UE in FDR mode may determine the necessity (or need) for RS for SI measurement of the specific subband. In this case, since the BS fails to recognize that the RS for the SI measurement is necessary for the specific subband of the UE, the UE needs to explicitly transmit information (including resource location of RS, etc.) on the RS for additional SI measurement to the BS. And, such information may be transmitted to the BS through PUCCH, PUSCH, or the like. The reason why such explicit signaling is necessary is described as follows. Namely, as feedback on an existing SI measurement result is delivered in a manner of being linked to a given RS, it is unable to report an SI measurement result of a subband having an RS not assigned thereto. And, considerable time is consumed for the existing result feedback and new RS assignment.

Proposal 6

A UE or BS may combine periodic SI measurement and aperiodic SI measurement for wideband support.

Although periodic SI measurement is performed, an SI signal may be received strongly over a determined threshold due to a result of incorrect analog SI measurement upon FDR mode operation. In this case, the aperiodic SI measurement of Proposal 1-2 is usable together as well as the existing periodic SI measurement. In case that block NACK is generated due to high SI of a specific subband between the previously assigned RS due to broadband, a UE in FDR mode may determine the necessity for RS for SI measurement on a specific subband. In this case, since the BS fails to recognize that the RS for the SI measurement is necessary for the specific subband of the UE, the UE needs to explicitly transmit information (including resource location of RS, etc.) on the RS for additional SI measurement to the BS. And, such information may be transmitted to the BS through PUCCH, PUSCH, or the like. The reason why such explicit signaling is necessary is described as follows. Namely, as feedback on an existing SI measurement result is delivered in a manner of being linked to a given RS, it is unable to report an SI measurement result of a subband having an RS not assigned thereto. And, considerable time is consumed for the existing result feedback and new RS assignment.

Proposal 7

A UE is implicitly aware of density and assigned location of RS for SI measurement (or SI) according to a resource block (or bandwidth), and a BS transmits RS.

The UE performs UL transmission on the allocated Resource Block (RB). In doing so, in order to cancel the generated SI, the RS for the SI measurement may be transmitted with specific density. For example, if density is 4 per RB and 4 RBs are allocated through UL grant, the UE transmits total 16 SI measurement RSs.

For example, an allocated location may be configured with Subcarrier index % density (=3)+offset (UE ID % subframe number). For example, in case of offset, it may be shifted based on cell id (e.g., cell id % 12).

Proposal 7-1

The density may be assigned or configured UE-specifically by higher layer signaling such as RRC. Or, the density may be configured with system information (e.g., MIB, SIB, etc.) commonly. Information (e.g., density of RS, periodicity, time & frequency positions, offset, etc.) of the SI measurement RS may be configured in a manner of being predefined. Particularly, as the density information is a factor that affects SIC performance, it may be predefined. And, this density information implicitly indicates a location of the assigned SI measurement RS.

Proposal 7-2

The density may be changed depending on an allocated RB size of a UE as follows. The density of the SI measurement RS is a factor that affects SI estimation. Yet, if many RSs are excessively assigned on a wideband, it may cause waste of resources. Hence, the density of RS may be changed by a determined rule as follows.

For example, if density is 4 per RB and 4 RBs are allocated, 16 RSs are used. On the contrary, if 12 RBs are allocated, 8 RSs are usable according to density/2.

Namely, the following may be configured for example.

The rule of 10 RBs>Allocated RBs, maintaining density, 10 RBs<Allocated RBs density/2 may be provided. It may operate according to a density rule different from the above example.

Proposal 7.3

If determining that SIC fails to operate well, a UE may transmit a request for increasing density of SI measurement RS to a BS.

The density of the SI measurement RS is a factor that affects SI estimation, and it may happen that the density of the SI measurement RS needs to be raised depending on an environment. For example, if frequency selectivity characteristic of SI is severe, it may correspond to a case that temporal variation of SI is severe. In this case, a UE may inform a BS of failure of SI or degradation of performance in various ways. To raise the density of the SI measurement RS of the UE, the BS may change and indicate a value of the density of the SI measurement RS of the UE, which may be indicated by higher layer signaling such as RRC signaling.

Proposal 7-4

A UE may transmit SI measurement RS added to a portion other than an allocated RB location. A BS may give an indication of a field for the additional transmission to the UE through UL grant.

A location of the SI measurement RS is a factor that affects SI estimation as well as the density of the SI measurement RS. SI RS may be transmitted added to an adjacent RB portion other than an allocated RB location together with the SI measurement RS. Effects obtained from additionally transmitting the SI RS on the adjacent RB portion are described as follows.

The UE may better perform SI channel estimation through an extrapolation effect by transmitting the SI measurement RS on a portion other than the allocated RB and enhance performance of SIC. To this end, the BS may transmit an ON/OFF field corresponding to the additional transmission of the SI measurement RS to the UE through predetermined signaling. If the BS indicates the additional transmission of the SI measurement RS through the corresponding ON/OFF field, the UE may additionally transmit the SI measurement RS on both sides spaced apart from an edge of the allocated RB by offset. In this case, the offset value may include a value predefined by RRC or system information, and the BS may forward the offset value to the UE by predetermined signaling.

The above-described proposals may be implemented individually, and the proposals may be combined to configure an embodiment of the present disclosure.

The embodiments described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment (or proposal) may be included in another embodiment and may be replaced with corresponding constructions of another embodiment. It will be obvious that claims that do not explicitly cite each other in the appended claims may be presented in combination as an exemplary embodiment of the present invention or included as a new claim by subsequent amendment after the application is filed.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description and all changes coming within the meaning and equivalency range of the appended claims are intended to be embraced therein.

INDUSTRIAL APPLICABILITY

A method of receiving information for measuring self-interference and user equipment therefor are industrially applicable to various wireless communication systems such as 3GPP LTE/LTE-A systems, 5G communication systems, etc.

What is claimed is:

1. A method of receiving information for measuring self-interference by a user equipment, the method comprising:
   receiving Reference Signal (RS) configuration information on a RS for a self-interference measurement from a base station;
   measuring self-interference using the RS for the self-interference measurement based on the RS configuration information;
   reporting information on a measurement result of the self-interference to the base station,
   wherein measuring the self-interference further comprises:
   obtaining, for each of a plurality of frequency locations, a residual self-interference measurement value which remains after self-interference cancellation (SIC) is performed by the user equipment based on the RS configuration information; and wherein reporting the information on the measurement result of the self-interference comprises:
   selecting M residual self-interference measurement values from among a plurality of residual self-interference measurement values obtained for the plurality of frequency locations; and
   reporting, to the base station, the selected M residual self-interference measurement values along with an RS configuration index associated with each of the selected M residual self-interference measurement values.

2. The method of claim 1, wherein the RS configuration information includes information on a resource location of the RS for the self-interference measurement.

3. The method of claim 1, wherein the RS configuration information is received through at least one of Radio Resource Control (RRC) message, Downlink Control Information (DCI), or a group-common Physical Downlink Control CHannel (PDCCH).

4. The method of claim 1, further comprising: receiving control information indicating whether to measure the self-interference based on the RS configuration information being valid.

5. The method of claim 4, wherein the control information further includes information on a frequency location of the RS related to the valid RS configuration information.

6. The method of claim 4, wherein the control information further includes information of a specific time period in which the RS configuration information is valid and wherein the measurement of the self-interference is performed during the specific time period.

7. The method of claim 1, wherein the information on the measurement result of the self-interference is periodically reported.

8. The method of claim 1, further comprising: receiving a signal indicating whether to enable or disable periodic self-interference measurement,
   wherein the self-interference measurement is related to periodic self-interference measurement based on the signal indicating "enable".

9. The method of claim 1, wherein the self-interference cancellation is performed in an analog domain.

10. A user equipment for receiving information for measuring self-interference, the user equipment comprising:
    a receiver configured to receive Reference Signal (RS) configuration information on an RS for self-interference measurement from a base station;
    a processor configured to measure self-interference using the RS for the self-interference measurement based on the RS configuration information; and
    a transmitter configured to report information on a measurement result of the self-interference to the base station,
    wherein the processor is further configured to:
    obtain, for each of a plurality of frequency locations, a residual self-interference measurement value, the residual self-interference measurement value being determined after self-interference cancellation (SIC) is performed based on the RS configuration information; and
    select M residual self-interference measurement values among a plurality of residual self-interference measurement values obtained for the plurality of frequency locations; and
    wherein the information on the measurement result of the self-interference reported to the base station includes the selected M residual self-interference measurement values and an RS configuration index associated with each of the selected M residual self-interference measurement values.

11. The user equipment of claim 10, wherein the RS configuration information includes information on a resource location of the RS for the self-interference measurement.

12. The user equipment of claim 10, wherein the receiver is configured to receive control information indicating to perform the self-interference measurement based on the RS configuration information being valid.

13. The user equipment of claim 10, wherein the self-interference cancellation is performed in an analog domain.

14. The user equipment of claim 10, wherein the user equipment is configured to communicate with at least one of another user equipment, a user equipment related to an autonomous driving vehicle, another base station, or a network.

* * * * *